US007036587B2

(12) United States Patent
Munoz, Jr. et al.

(10) Patent No.: US 7,036,587 B2
(45) Date of Patent: May 2, 2006

(54) METHODS OF DIVERTING TREATING FLUIDS IN SUBTERRANEAN ZONES AND DEGRADABLE DIVERTING MATERIALS

(75) Inventors: Trinidad Munoz, Jr., Duncan, OK (US); Bradley L. Todd, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 336 days.

(21) Appl. No.: 10/609,031

(22) Filed: Jun. 27, 2003

(65) Prior Publication Data

US 2004/0261996 A1   Dec. 30, 2004

(51) Int. Cl.
E21B 33/138 (2006.01)
E21B 37/00 (2006.01)
E21B 43/25 (2006.01)
E21B 43/27 (2006.01)

(52) U.S. Cl. ............... 166/279; 166/281; 166/282; 166/292; 166/294; 166/305.1; 166/309; 166/312; 507/211; 507/219; 507/237; 507/241; 507/277; 507/902

(58) Field of Classification Search ........... 166/279, 166/281, 282, 283, 292, 294, 295, 304, 305.1, 166/309, 312; 507/211, 214, 219, 237, 241, 507/260, 277, 902
See application file for complete search history.

(56) References Cited

U.S. PATENT DOCUMENTS

| 2,703,316 A | 3/1955 | Palmer |
| 3,173,484 A | 3/1965 | Huitt et al. ............... 166/280.1 |
| 3,195,635 A | 7/1965 | Fast ........................ 166/280.1 |
| 3,272,650 A | 9/1966 | MacVittie ...................... 134/7 |
| 3,302,719 A | 2/1967 | Fischer .................... 166/280.2 |
| 3,319,716 A * | 5/1967 | Dill ............................ 166/282 |
| 3,364,995 A | 1/1968 | Atkins et al. ............ 166/280.1 |
| 3,366,178 A | 1/1968 | Malone et al. ........... 166/280.1 |
| 3,455,390 A | 7/1969 | Gallus ........................ 166/295 |
| 3,779,914 A | 12/1973 | Nimerick |
| 3,819,525 A | 6/1974 | Hattenbrun ................. 252/132 |
| 3,912,692 A | 10/1975 | Casey et al. |
| 3,948,672 A | 4/1976 | Harnsberger ................ 106/720 |
| 3,955,993 A | 5/1976 | Curtice et al. ............. 106/662 |
| 3,960,736 A | 6/1976 | Free et al. |
| 3,968,840 A | 7/1976 | Tate ........................ 166/280.1 |
| 3,998,272 A * | 12/1976 | Maly .......................... 166/281 |
| 3,998,744 A | 12/1976 | Arnold et al. .............. 507/269 |
| 4,068,718 A | 1/1978 | Cooke, Jr. et al. ........ 166/280.2 |
| 4,172,066 A | 10/1979 | Zweigle et al. |
| 4,387,769 A | 6/1983 | Erbstoesser et al. ........ 507/219 |
| 4,460,052 A | 7/1984 | Gockel ........................ 175/72 |
| 4,498,995 A | 2/1985 | Gockel |
| 4,526,695 A | 7/1985 | Erbstoesser et al. ........ 507/219 |
| 4,620,596 A * | 11/1986 | Mondshine ................. 166/292 |
| 4,694,905 A | 9/1987 | Armbruster ................. 166/280 |
| 4,715,967 A | 12/1987 | Bellis et al. |
| 4,716,964 A * | 1/1988 | Erbstoesser et al. ........ 166/284 |
| 4,785,884 A | 11/1988 | Armbruster ................. 166/280 |
| 4,797,262 A | 1/1989 | Dewitz ....................... 422/142 |
| 4,817,721 A | 4/1989 | Pober ......................... 166/295 |
| 4,848,467 A | 7/1989 | Cantu et al. ................ 166/281 |
| 4,886,354 A | 12/1989 | Welch et al. .................. 356/70 |
| 4,957,165 A | 9/1990 | Cantu et al. ................ 166/295 |
| 4,986,353 A | 1/1991 | Clark et al. ................ 166/279 |
| 4,986,355 A | 1/1991 | Casad et al. ............... 166/295 |
| 5,142,023 A | 8/1992 | Gruber et al. .............. 528/354 |
| 5,191,931 A * | 3/1993 | Himes et al. ............... 166/282 |
| 5,216,050 A | 6/1993 | Sinclair ....................... 524/108 |
| 5,247,059 A | 9/1993 | Gruber et al. .............. 528/354 |
| 5,249,628 A | 10/1993 | Surjaatmadja ............... 166/305 |
| 5,295,542 A | 3/1994 | Cole et al. ................. 166/278 |
| 5,325,923 A | 7/1994 | Surjaatmadja et al. ...... 166/308 |
| 5,330,005 A | 7/1994 | Card et al. ................. 166/280 |
| 5,359,026 A | 10/1994 | Gruber ........................ 528/354 |
| 5,360,068 A | 11/1994 | Sprunt et al. .............. 166/259 |
| 5,363,916 A | 11/1994 | Himes et al. ............... 166/276 |
| 5,373,901 A | 12/1994 | Norman et al. ............. 166/300 |
| 5,386,874 A | 2/1995 | Laramay et al. ............ 166/300 |
| 5,396,957 A | 3/1995 | Surjaatmadja et al. ...... 166/308 |
| 5,402,846 A | 4/1995 | Jennings, Jr. et al. ....... 166/259 |
| 5,464,060 A | 11/1995 | Hale et al. .................. 166/293 |
| 5,475,080 A | 12/1995 | Gruber et al. .............. 528/354 |
| 5,484,881 A | 1/1996 | Gruber et al. .............. 528/354 |

(Continued)

FOREIGN PATENT DOCUMENTS

EP    0 510 762 A2    4/1992

(Continued)

OTHER PUBLICATIONS

Cantu, et al, *Laboratory and Field Evaluation of a Combined Fluid-Loss-Control Additive and Gel Breaker for Fracturing Fluids*, SPE 18211, Society of Petroleum Engineers, 1990.

(Continued)

*Primary Examiner*—George Suchfield
(74) *Attorney, Agent, or Firm*—Robert A. Kent; Baker Botts

(57) ABSTRACT

Methods of diverting treating fluids in subterranean zones penetrated by well bores are provided. The methods basically comprise the following steps. A degradable particulate diverting material is placed in a subterranean zone that contains releasable water. A treating fluid is then introduced into the subterranean zone which is diverted by the degradable particulate diverting material therein. Thereafter, the degradable particulate diverting material is allowed to at least partially degrade in the presence of the released water in the subterranean zone.

60 Claims, No Drawings

U.S. PATENT DOCUMENTS

| | | | |
|---|---|---|---|
| 5,497,830 A | 3/1996 | Boles et al. | 166/300 |
| 5,499,678 A | 3/1996 | Surjaatmadja et al. | 166/298 |
| 5,505,787 A | 4/1996 | Yamaguchi | 134/4 |
| 5,512,071 A | 4/1996 | Yam et al. | 51/307 |
| 5,536,807 A | 7/1996 | Gruber et al. | 528/354 |
| 5,594,095 A | 1/1997 | Gruber et al. | 528/354 |
| 5,604,186 A | 2/1997 | Hunt et al. | 507/204 |
| 5,607,905 A | 3/1997 | Dobson, Jr. et al. | 507/211 |
| 5,670,473 A | 9/1997 | Scepanski | 510/445 |
| 5,698,322 A | 12/1997 | Tsai et al. | 428/373 |
| 5,765,642 A | 6/1998 | Surjaatmadja | 166/297 |
| 5,791,415 A | 8/1998 | Nguyen et al. | 166/280 |
| 5,833,000 A | 11/1998 | Weaver et al. | 166/276 |
| 5,849,401 A | 12/1998 | El-Afandi et al. | 428/215 |
| 5,853,048 A | 12/1998 | Weaver et al. | 166/279 |
| 5,893,416 A | 4/1999 | Read | 166/304 |
| 5,908,073 A | 6/1999 | Nguyen et al. | 166/276 |
| 5,924,488 A | 7/1999 | Nguyen et al. | 166/280 |
| 5,964,291 A | 10/1999 | Bourne et al. | 166/279 |
| 6,004,400 A | 12/1999 | Bishop et al. | 134/2 |
| 6,024,170 A | 2/2000 | McCabe et al. | 166/300 |
| 6,028,113 A | 2/2000 | Scepanski | 514/643 |
| 6,047,772 A | 4/2000 | Weaver et al. | 166/276 |
| 6,114,410 A | 9/2000 | Betzold | 523/130 |
| 6,123,965 A | 9/2000 | Jacob et al. | 424/489 |
| 6,131,661 A | 10/2000 | Conner et al. | 166/300 |
| 6,135,987 A | 10/2000 | Tsai et al. | 604/365 |
| 6,138,760 A | 10/2000 | Lopez et al. | 166/300 |
| 6,143,698 A | 11/2000 | Murphey et al. | 507/145 |
| 6,169,058 B1 | 1/2001 | Le et al. | 507/222 |
| 6,172,011 B1 | 1/2001 | Card et al. | 507/204 |
| 6,202,751 B1 | 3/2001 | Chatterji et al. | 166/276 |
| 6,209,643 B1 | 4/2001 | Nguyen et al. | 166/276 |
| 6,209,646 B1 | 4/2001 | Reddy et al. | 166/300 |
| 6,214,773 B1 | 4/2001 | Harris et al. | 507/271 |
| 6,260,622 B1 | 7/2001 | Blok et al. | 166/305.1 |
| 6,311,773 B1 | 11/2001 | Todd et al. | 166/280 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,357,527 B1 | 3/2002 | Norman et al. | 166/300 |
| 6,364,945 B1 | 4/2002 | Chatterji et al. | 106/677 |
| 6,380,138 B1 | 4/2002 | Ischy et al. | 507/204 |
| 6,390,195 B1 | 5/2002 | Nguyen et al. | 166/276 |
| 6,394,185 B1 | 5/2002 | Constien | 166/296 |
| 6,422,314 B1 | 7/2002 | Todd et al. | 166/312 |
| 6,454,003 B1 | 9/2002 | Chang et al. | 166/270 |
| 6,485,947 B1 | 11/2002 | Rajgarhia et al. | 435/139 |
| 6,488,763 B1 | 12/2002 | Brothers et al. | 106/692 |
| 6,494,263 B1 | 12/2002 | Todd | 166/312 |
| 6,508,305 B1 | 1/2003 | Brannon et al. | 166/293 |
| 6,527,051 B1 | 3/2003 | Reddy et al. | 166/300 |
| 6,554,067 B1 * | 4/2003 | Davies et al. | 166/276 |
| 6,554,071 B1 | 4/2003 | Reddy et al. | 166/293 |
| 6,569,814 B1 | 5/2003 | Brady et al. | 507/201 |
| 6,667,279 B1 | 12/2003 | Hessert et al. | 507/225 |
| 6,681,856 B1 | 1/2004 | Chatterji et al. | 166/294 |
| 6,686,328 B1 | 2/2004 | Binder | 510/446 |
| 6,761,218 B1 | 7/2004 | Nguyen et al. | 166/278 |
| 6,763,888 B1 | 7/2004 | Harris et al. | 166/305.1 |
| 6,896,058 B1 * | 5/2005 | Munoz et al. | 166/279 |
| 2002/0036088 A1 | 3/2002 | Todd | 166/300 |
| 2002/0125012 A1 | 9/2002 | Dawson et al. | 166/300 |
| 2003/0060374 A1 | 3/2003 | Cooke, Jr. | 507/200 |
| 2003/0139298 A1 * | 7/2003 | Fu et al. | 507/200 |
| 2003/0188766 A1 | 10/2003 | Banerjee et al. | 134/7 |
| 2004/0055747 A1 | 3/2004 | Lee | 166/278 |
| 2004/0106525 A1 | 6/2004 | Willbert et al. | 507/200 |
| 2004/0138068 A1 | 7/2004 | Rimmer et al. | 507/100 |
| 2004/0152601 A1 | 8/2004 | Still et al. | 507/100 |
| 2004/0152602 A1 | 8/2004 | Boles | 507/100 |
| 2004/0231845 A1 | 11/2004 | Cooke, Jr. | 166/279 |
| 2004/0261993 A1 | 12/2004 | Nguyen | 166/276 |
| 2004/0261995 A1 | 12/2004 | Nguyen et al. | 166/279 |
| 2004/0261999 A1 | 12/2004 | Nguyen | 166/292 |
| 2005/0006095 A1 | 1/2005 | Justus et al. | 166/295 |

FOREIGN PATENT DOCUMENTS

| | | |
|---|---|---|
| EP | 0 879 935 A2 | 11/1998 |
| EP | 0 879 935 A3 | 10/1999 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 2000/57022 | 9/2000 |
| WO | WO 2001/02698 | 1/2001 |
| WO | WO 01/87797 A1 | 11/2001 |
| WO | WO 02/12674 A1 | 2/2002 |
| WO | WO 03/027431 | 4/2003 |
| WO | WO 2004/007905 | 1/2004 |

OTHER PUBLICATIONS

Love, et al, *Selectively Placing Many Fractures in Openhole Horizontal Wells Improves Production*, SPE 50422, Society of Petroleum Engineers, 1998.

McDaniel, et al, *Evolving New Stimulation Process Proves Highly Effective in Level 1 Dual-Lateral Completion*, SPE 78697, Society of Petroleum Engineers, 2002.

Albertsson, et al, *Aliphatic Polyesters: Systhesis, Properties and Applications*, Advances in Polymer Science, vol. 157, 2002.

Dechy-Cabaret, et al, *Controlled Ring-Opening Polymerization of Lactide and Glycolide*, American Chemical Society, Chemical Reviews, A-Z, AA-AD, received 2004.

Funkhouser, et al, *Synthetic Polymer Fracturing Fluid for High-Temperature Applications*, SPE 80236, Society of Petroleum Engineers, 2003.

*Chelating Agents*, Encyclopedia of Chemical Technology, vol. 5 (764-795).

Vichaibun, et al, *A New Assay for the Enzymatic Degradation of Polylactic Acid, Short Report*, ScienceAsia, vol. 29, 2003 (pp. 297-300).

Halliburton, *SurgiFrac$^{SM}$ Service, A Quick and Cost-Effective Method to Help Boost Production From Openhole Horizontal Completions*, Halliburton Communications, HO3297, 2002.

Halliburton, *Cobra Frac$^{SM}$ Service, Coiled Tubing Fracturing—Cost-Effective Method for Stimulating Untapped Reserves*, HO2319R, Halliburton Energy Services, 2000.

Halliburton, *CobraJet Frac$^{SM}$ Service, Cost-effective Technology That Can Help Reduce Cost Per BOE Produced, Shorten Cycle Time and Reduce Capex*, Halliburton Communications.

Blauch, et al, *Aqueous Tackifier and Methods of Controlling Particulates*, U.S. Appl. No. 10/864,061, filed Jun. 9, 2004.

Blauch, et al, *Aqueous-Based Tackifier Fluids and Methods of Use*, U.S. Appl. No. 10/864,618, filed Jun. 9, 2004.

Foreign Search Report and Opinion (PCT Appl. No. GB2004/002043), May 11, 2004.

"Poly (phenyllactide) : Synthesis, Characterization, and Hydrolytic Degradation" published in Biomacromolecules, vol. 2, No. 3, 2001, pp. 658-663 by Tara L. Simmons and Gregory L. Baker.

"Synthesis and Properties of Polymers Derived from Substituted Lactic Acids" published in 2001 American Chemical Society, Chapter 12, pp. 147-159 by Mao Yin, Tara L. Simmons and Gregory L. Baker.

"Preparation and Characterization of Substituted Polylactides" published in 199 American Chemical Society, vol. 32, No. 23, pp. 7711-7718 by Mao Yin and Gregory L. Baker.

Y. Chiang et al.: "Hydrolysis Of Ortho Esters: Further Investigation Of The Factors Which Control The Rate-Determining Step," Engineering Information Inc., NY, NY, vol. 105, No. 23 (XP-002322842), Nov. 16, 1983.

M. Ahmad, et al.: "Ortho Ester Hydrolysis: Direct Evidence For A Three-Stage Reaction Mechanism," Engineering Information Inc., NY, NY, vol. 101, No. 10 (XP-002322843), May 9, 1979.

Skrabal et al., *The Hydrolysis Rate Of Orthoformic Acid Ethyl Ether*, Chemical Institute of the University of Graz, pp. 1-38, Jan. 13, 1921.

Heller, et al., *Poly(ortho esters)—From Concept To Reality*, Biomacromolecules, vol. 5, No. 5, 2004 (pp. 1625-1632), May 9, 1979.

Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).

Ng, et al., *Synthesis and Erosion Studies of Self-Catalyzed Poly(ortho ester)s*, American Chemical Society, vol. 30, No. 4, 1997 (pp. 770-772).

Ng, et al., *Development Of A Poly(ortho ester) prototype With A Latent Acid In The Polymer Backbone For 5-fluorouracil Delivery*, Journal of Controlled Release 65 (2000), (pp. 367-374).

Rothen-Weinhold, et al., Release of BSA from poly(ortho ester) extruded thin strands, *Journal of Controlled Release 71*, 2001, (pp. 31-37).

Heller, et al., *Poly(ortho ester)s—their development and some recent applications*, European Journal of Pharmaceutics and Biopharmaceutics, 50, 2000, (pp. 121-128).

Heller, et al., *Poly(ortho esters); synthesis, characterization, properties and uses*, Advanced Drug Delivery Reviews, 54, 2002, (pp. 1015-1039).

Heller, et al., *Poly(ortho esters) For The Pulsed And Continuous Delivery of Peptides And Proteins*, Controlled Release and Biomedical Polymers Department, SRI International, (pp. 39-46).

Zignani, et al., *Subconjunctival biocompatibility of a viscous bioerodable poly(ortho ester)*, J. Biomed Mater Res, 39, 1998, pp. 277-285.

Toncheva, et al., *Use of Block Copolymers of Poly(Ortho Esters) and Poly (Ethylene Glycol)*, Journal of Drug Targeting, 2003, vol. 11(6), pp. 345-353.

Schwach-Abdellaoui, et al., *Control of Molecular Weight For Auto-Catalyzed Poly(ortho ester) Obtained by Polycondensation Reaction*, International Journal of Polymer Anal. Charact., 7: 145-161, 2002, pp. 145-161.

Heller, et al., *Release of Norethindrone from Poly(Ortho Esters)*, Polymer Engineering and Science, Mid-Aug., 1981, vol. 21, No. 11 (pp. 727-731).

Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.

Todd, et al., *A Chemical "Trigger" Useful For Oilfield Applications*, Society of Petroleum Engineers, Inc., SPE 92709, Feb. 4, 2005.

* cited by examiner

METHODS OF DIVERTING TREATING FLUIDS IN SUBTERRANEAN ZONES AND DEGRADABLE DIVERTING MATERIALS

BACKGROUND OF THE INVENTION

1. Field of the Invention

The present invention provides methods of diverting treating fluids in subterranean zones penetrated by well bores.

2. Description of the Prior Art

After a well bore is drilled and completed in a subterranean producing zone, it is often necessary to introduce a treating fluid into the zone. For example, the producing zone can be stimulated by introducing an aqueous acid solution into the producing zone to thereby increase its porosity and the production of hydrocarbons therefrom. In order to insure that the producing zone is contacted by the treating fluid uniformly, it has heretofore been the practice to place a particulate solid diverting agent in the zone. One technique has been to pack the diverting agent in perforation tunnels extending from the wellbore into the subterranean zone. The diverting agent in the perforation tunnels causes the treating fluid introduced therein to be uniformly distributed between all of the perforations whereby the subterranean zone is uniformly treated.

A problem in the use of the above described procedure is that the particulate solid diverting agent must subsequently be removed from the perforation tunnel to allow the maximum flow of produced hydrocarbon from the subterranean zone into the well bore. This has heretofore been accomplished by contacting the particulate solid diverting agent with a fluid which degrades the diverting agent, such as, water, oil, xylene and the like. While the clean-up procedures utilized have been successful in removing the diverting agent, they often entail considerable time and expense to carry out. Thus, there are needs for improved methods of uniformly introducing treating fluids into subterranean producing zones without the requirement of removing the particulate solid diverting agent by contacting it with a clean-up solution.

SUMMARY OF THE INVENTION

The present invention provides improved methods of diverting treating fluids introduced into subterranean producing zones which meet the needs described above and overcome the deficiencies of the prior art.

An example of the methods of the present invention comprises the following steps. A degradable particulate diverting material which is capable of degrading over time is placed in a subterranean zone. A treating fluid may be introduced into the subterranean zone which then is diverted by the degradable particulate diverting material therein. Thereafter, the degradable particulate diverting material is allowed to degrade in the presence of the source of water in the subterranean zone. The source of water may be provided by particulate hydrated organic or inorganic solid compounds introduced into the subterranean formation either before, during or after the degradable particulate diverting material is introduced.

Another improved method of the present invention comprises the following steps. A self-degradable particulate diverting material which degrades over time is placed in a subterranean producing zone. The self-degradable particulate diverting material comprises a mixture of a degradable particulate and a hydrated organic or inorganic solid compound. The treating fluid may be introduced into the subterranean zone and diverted by the self-degradable particulate diverting material therein. Thereafter, the degradable particulate in the self-degradable particulate diverting material is allowed to degrade in the water provided by the hydrated organic or inorganic compound which dehydrates over time when heated in the subterranean zone.

Yet another example of the methods of this invention comprises the following steps. A self-degradable particulate diverting material is packed into perforation tunnels formed in a subterranean zone which degrades therein over time. The self-degradable particulate diverting material comprises a mixture of a degradable particulate and a hydrated organic or inorganic compound. A treating fluid is introduced into the subterranean zone by way of the perforation tunnels which is diverted by the self-degradable particulate diverting material therein. Thereafter, the degradable particulate in the self-degradable particulate diverting material is allowed to degrade in the water provided by the hydrated organic or inorganic solid compound when heated in the subterranean zone.

The features and advantages of the present invention will be readily apparent to those skilled in the art upon a reading of the description of preferred embodiments which follows.

DETAILED DESCRIPTION OF THE INVENTION

The present invention provides improved methods of diverting a treating fluid in a subterranean zone penetrated by a well bore. In certain embodiments, the methods comprise the following steps. A degradable particulate diverting material comprising a degradable particulate which degrades over time is placed in the subterranean zone. A treating fluid is introduced into the subterranean zone which is diverted by the degradable particulate diverting material therein. Thereafter, the degradable particulate diverting material is allowed to degrade in the subterranean zone.

Nonlimiting examples of degradable particulates that may be used in conjunction with the compositions and methods of the present invention include but are not limited to degradable polymers. The term "particulate" as used herein is intended to include material particles having the physical shape of platelets, shavings, flakes, ribbons, rods, strips, spheroids, toroids, pellets, tablets or any other physical shape. The terms "degrade," "degradation," "degradable," and the like when used herein refer to both the two relative cases of hydrolytic degradation that the degradable particulate may undergo, i.e., heterogeneous (or bulk erosion) and homogeneous (or surface erosion), and any stage of degradation in between these two. This degradation can be a result of inter alia, a chemical or thermal reaction or a reaction induced by radiation.

Suitable examples of degradable polymers that may be used in accordance with the present invention include but are not limited to those described in the publication of Advances in Polymer Science, Vol. 157 entitled "Degradable Aliphatic Polyesters" edited by A.-C. Albertsson. Specific examples include homopolymers, random, block, graft, and star- and hyper-branched aliphatic polyesters. Polycondensation reactions, ring-opening polymerizations, free radical polymerizations, anionic polymerizations, carbocationic polymerizations, coordinative ring-opening polymerizations, and any other suitable process may prepare such suitable polymers. Specific examples of suitable polymers include polysaccharides such as dextran or cellulose; chitins; chitosans; proteins; aliphatic polyesters; poly(lactides); poly (glycolides); poly(ε-caprolactones); poly(hydroxybutyrates); poly(anhydrides); aliphatic polycarbonates; poly(orthoesters); poly(amino acids); poly(ethylene oxides); and polyphosphazenes. Of these suitable polymers, aliphatic polyesters and polyanhydrides are preferred.

Aliphatic polyesters degrade chemically, inter alia, by hydrolytic cleavage. Hydrolysis can be catalyzed by either acids or bases. Generally, during the hydrolysis, carboxylic end groups are formed during chain scission, and this may enhance the rate of further hydrolysis. This mechanism is known in the art as "autocatalysis," and is thought to make polyesters more bulk eroding.

Suitable aliphatic polyesters have the general formula of repeating units shown below:

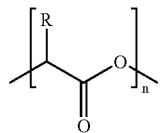

Formula I where n is an integer between 75 and 10,000 and R is selected from the group consisting of hydrogen, alkyl, aryl, alkylaryl, acetyl, heteroatoms, and mixtures thereof.

Of the suitable aliphatic polyesters, poly(lactide) is preferred. Poly(lactide) is synthesized either from lactic acid by a condensation reaction or more commonly by ring-opening polymerization of cyclic lactide monomer. Since both lactic acid and lactide can achieve the same repeating unit, the general term poly(lactic acid) as used herein refers to formula I without any limitation as to how the polymer was made such as from lactides, lactic acid, or oligomers, and without reference to the degree of polymerization or level of plasticization.

The lactide monomer exists generally in three different forms: two stereoisomers L- and D-lactide and racemic D,L-lactide (meso-lactide). The oligomers of lactic acid, and oligomers of lactide are defined by the formula:

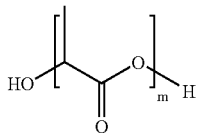

Formula II where m is an integer: $2 \leq m \leq 75$. Preferably m is an integer: $2 < m < 10$. These limits correspond to number average molecular weights below about 5,400 and below about 720, respectively. The chirality of the lactide units provides a means to adjust, inter alia, degradation rates, as well as physical and mechanical properties. Poly(L-lactide), for instance, is a semicrystalline polymer with a relatively slow hydrolysis rate. This could be desirable in applications of the present invention where a slower degradation of the degradable particulate is desired. Poly(D,L-lactide) may be a more amorphous polymer with a resultant faster hydrolysis rate. This may be suitable for other applications where a more rapid degradation may be appropriate. The stereoisomers of lactic acid may be used individually or combined to be used in accordance with the present invention. Additionally, they may be copolymerized with, for example, glycolide or other monomers like ε-caprolactone, 1,5-dioxepan-2-one, trimethylene carbonate, or other suitable monomers to obtain polymers with different properties or degradation times. Additionally, the lactic acid stereoisomers can be modified to be used in the present invention by, inter alia, blending, copolymerizing or otherwise mixing the stereoisomers, blending, copolymerizing or otherwise mixing high and low molecular weight polylactides, or by blending, copolymerizing or otherwise mixing a polylactide with another polyester or polyesters.

Further plasticizers may be used in the compositions and methods of the present invention, and include derivatives of oligomeric lactic acid, selected from the group defined by the formula:

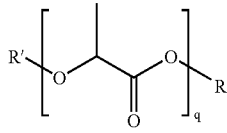

Formula III where R is hydrogen, alkyl, aryl, alkylaryl or acetyl, and R is saturated, where R' is hydrogen, alkyl, aryl, alkylaryl or acetyl, and R' is saturated, where R and R' cannot both be H, where q is an integer: $2 \leq q \leq 75$; and mixtures thereof. Preferably q is an integer: $2 \leq q \leq 10$. As used herein the term "derivatives of oligomeric lactic acid" includes derivatives of oligomeric lactide.

The plasticizers may be present in any amount that provides the desired characteristics. For example, the various types of plasticizers discussed herein provide for (a) more effective compatibilization of the melt blend components; (b) improved processing characteristics during the blending and processing steps; and (c) control and regulate the sensitivity and degradation of the polymer by moisture. For pliability, plasticizer is present in higher amounts while other characteristics are enhanced by lower amounts. The compositions allow many of the desirable characteristics of pure nondegradable polymers. In addition, the presence of plasticizer facilitates melt processing, and enhances the degradation rate of the compositions in contact with the environment. The intimately plasticized composition should be processed into a final product in a manner adapted to retain the plasticizer as an intimate dispersion in the polymer for certain properties. These can include: (1) quenching the composition at a rate adapted to retain the plasticizer as an intimate dispersion; (2) melt processing and quenching the composition at a rate adapted to retain the plasticizer as an intimate dispersion; and (3) processing the composition into a final product in a manner adapted to maintain the plasticizer as an intimate dispersion. In certain preferred embodiments, the plasticizers are at least intimately dispersed within the aliphatic polyester.

A preferred aliphatic polyester is poly(lactic acid). D-lactide is a dilactone, or cyclic dimer, of D-lactic acid. Similarly, L-lactide is a cyclic dimer of L-lactic acid. Meso D,L-lactide is a cyclic dimer of D-, and L-lactic acid. Racemic D,L-lactide comprises a 50/50 mixture of D-, and L-lactide. When used alone herein, the term "D,L-lactide" is intended to include meso D,L-lactide or racemic D,L-lactide. Poly(lactic acid) may be prepared from one or more of the above. The chirality of the lactide units provides a means to adjust degradation rates as well as physical and mechanical properties. Poly(L-lactide), for instance, is a semicrystalline polymer with a relatively slow hydrolysis rate. This could be desirable in applications of the present invention where slow degradation is preferred. Poly(D,L-lactide) is an amorphous polymer with a faster hydrolysis rate. This may be suitable for other applications of the present invention. The stereoisomers of lactic acid may be used individually combined or copolymerized in accordance with the present invention.

The aliphatic polyesters of the present invention may be prepared by substantially any of the conventionally known manufacturing methods such as those disclosed in U.S. Pat. Nos. 6,323,307; 5,216,050; 4,387,769; 3,912,692 and 2,703,316, the relevant disclosures of which are incorporated herein by reference.

Poly(anhydrides) are another type of particularly suitable degradable polymer useful in the present invention. Poly (anhydride) hydrolysis proceeds, inter alia, via free carboxylic acid chain-ends to yield carboxylic acids as final degradation products. The erosion time can be varied over a broad range of changes in the polymer backbone. Examples of suitable poly(anhydrides) include poly(adipic anhydride), poly(suberic anhydride), poly(sebacic anhydride), and poly (dodecanedioic anhydride). Other suitable examples include but are not limited to poly(maleic anhydride) and poly (benzoic anhydride).

The physical properties of degradable polymers depend on several factors such as the composition of the repeat units, flexibility of the chain, presence of polar groups, molecular mass, degree of branching, crystallinity, orientation, etc. For example, short chain branches reduce the degree of crystallinity of polymers while long chain branches lower the melt viscosity and impart, inter alia, elongational viscosity with tension-stiffening behavior. The properties of the material utilized can be further tailored by blending, and copolymerizing it with another polymer, or by a change in the macromolecular architecture (e.g., hyper-branched polymers, star-shaped, or dendrimers, etc.). The properties of any such suitable degradable polymers (e.g., hydrophobicity, hydrophilicity, rate of degradation, etc.) can be tailored by introducing select functional groups along the polymer chains. For example, poly(phenyllactide) will degrade at about ⅕th of the rate of racemic poly(lactide) at a pH of 7.4 at 55° C. One of ordinary skill in the art with the benefit of this disclosure will be able to determine the appropriate functional groups to introduce to and the structure of the polymer chains to achieve the desired physical properties of the degradable polymers.

In choosing the appropriate degradable material, one should consider the degradation products that will result. These degradation products should not adversely affect other operations or components. The choice of degradable material also can depend, at least in part, on the conditions of the well, e.g., wellbore temperature. For instance, lactides have been found to be suitable for lower temperature wells, including those within the range of 60° F. to 150° F., and polylactides have been found to be suitable for well bore temperatures above this range. Also, poly(lactic acid) may be suitable for higher temperature wells. Some stereoisomers of poly(lactide) or mixtures of such stereoisomers may be suitable for even higher temperature applications.

Examples of treating fluids which can be introduced into the subterranean zone containing the degradable particulate diverting material include, but are not limited to, water based foams, fresh water, salt water, formation water and various aqueous solutions. The aqueous solutions include, but are not limited to, aqueous acid solutions, aqueous scale inhibitor material solutions, aqueous water blocking material solutions, aqueous clay stabilizer solutions, aqueous chelating agent solutions, aqueous surfactant solutions and aqueous paraffin removal solutions.

Another improved method of diverting a treating fluid in a subterranean zone penetrated by a well bore comprises the following steps. A self-degradable particulate diverting material which degrades over time is placed in the subterranean zone. The self-degradable particulate diverting material comprises a mixture of a degradable aliphatic polyester and a hydrated organic or inorganic solid compound. A treating fluid may be introduced into the subterranean zone and then diverted by the self-degradable particulate diverting material therein. Thereafter, the degradable aliphatic polyester in the self-degradable particulate diverting material is allowed to at least partially degrade in the releasable water provided by the hydrated organic or inorganic compound which dehydrates over time when heated in the subterranean zone.

Examples of the hydrated organic or inorganic solid compounds that can be utilized in the self-degradable diverting material include, but are not limited to, hydrates of organic acids or their salts such as sodium acetate trihydrate, L-tartaric acid disodium salt dihydrate, sodium citrate dihydrate, hydrates of inorganic acids or their salts such as sodium tetraborate decahydrate, sodium hydrogen phosphate heptahydrate, sodium phosphate dodecahydrate, amylose, starch-based hydrophilic polymers, and cellulose-based hydrophilic polymers. Of these, sodium acetate trihydrate is preferred. The lactide units of the aliphatic polyester and the releasable water of the organic or inorganic solid compound utilized are preferably present in the mixture in equal molar amounts.

The treating fluid introduced into the subterranean zone containing the self-degradable particulate diverting material can be any of a variety of treating fluids, including but not limited to, oil, oil-water emulsions, oil based foams, water based foams, fresh water, salt water, formation water and various other aqueous solutions. The examples of aqueous treating solutions which can be used include, but are not limited to, aqueous acid solutions, aqueous scale inhibiting material solutions, aqueous water blocking material solutions, aqueous clay stabilizer solutions, aqueous chelating agent solutions, aqueous surfactant solutions and aqueous paraffin removal solutions.

When the aqueous treating fluid is an aqueous acid solution, the aqueous acid solution can include one or more mineral acids such as hydrochloric acid, hydrofluoric acid, or organic acids such as acetic acid, formic acid and other organic acids or mixtures thereof. In acidizing procedures for increasing the porosity of subterranean producing zones, a mixture of hydrochloric and hydrofluoric acids is commonly utilized.

Another aqueous treating fluid which can be introduced into the subterranean producing zone in accordance with this invention is a solution of an aqueous scale inhibitor material. The aqueous scale inhibitor solution can contain one or more scale inhibitor materials including, but not limited to, tetrasodium ethylenediamine acetate, pentamethylene phosphonate, hexamethylenediamine phosphonate and polyacrylate. These scale inhibitor materials attach themselves to the subterranean zone surfaces whereby they inhibit the formation of scale in tubular goods and the like when hydrocarbons and water are produced from the subterranean zone.

Another aqueous treating solution which can be utilized is a solution of an aqueous water blocking material. The water blocking material solution can contain one or more water blocking materials which attach themselves to the formation in water producing areas whereby the production of water is reduced or terminated. Examples of water blocking materials that can be used include, but are not limited to, sodium silicate gels, organic polymers cross-linked with metal cross-linkers and organic polymers cross-linked with organic cross-linkers. Of these, organic polymers cross-linked with organic cross-linkers are preferred.

Other aqueous solutions that can be used include, but are not limited to, aqueous clay stabilizer solutions, aqueous chelating agent solutions, aqueous surfactant solutions and aqueous paraffin removal solutions.

One method of the present invention for uniformly introducing a treating fluid into a subterranean zone penetrated by a well bore having perforation tunnels formed therein comprises the following steps. A self-degradable particulate diverting material which degrades over time is packed in the perforation tunnels in an amount sufficient to provide a substantially uniform pressure drop across two or more adjacent perforations or intervals. The self-degradable particulate diverting material comprises a mixture of a degradable aliphatic polyester and a hydrated organic or inorganic compound. The particulate may be introduced into the perforation tunnels by mixing the particulate with a carrier fluid introduced into the perforation tunnels or by any other suitable means. The carrier fluid may be any fluid which does not adversely react with the particulate. A treating fluid then is introduced into the subterranean zone by way of the perforation tunnels and is substantially uniformly diverted by the self-degradable particulate diverting material therein as a result of the substantially uniform pressure drop between adjacent perforations. Thereafter, the degradable aliphatic polyester in the self-degradable particulate diverting material is allowed to at least partially degrade in the releasable water provided by the hydrated organic or inorganic solid compound when heated in the subterranean zone.

The hydrated organic or inorganic solid compounds are those previously described with sodium acetate trihydrate being preferred. The lactide units of the aliphatic polyester and the releasable water from the organic or inorganic compound are preferably present in the mixture in equal molar amounts. It is to be understood that the specific amount of the hydrated compound that may be included will depend upon the presence of formation water, produced fluids, formation temperature, treating fluid and production rates.

The treating fluids that can be introduced into the subterranean zone include, but are not limited to, oil, oil-water emulsions, oil based foams, water based foams, fresh water, salt water, formation water and various aqueous solutions. The aqueous solutions that can be utilized are the same as those described previously.

The degradable particulate diverting materials of this invention can be placed in the subterranean zone or packed into perforation tunnels in the subterranean zone by introducing a carrier fluid containing the degradable particulate diverting materials into the subterranean zone. The carrier fluid dissipates into the subterranean zone and degradable particulate diverting materials is screened out of the carrier fluid by the formation. A variety of carrier fluids can be utilized including, but not limited to, water, brines, seawater or formation water. Of these, in certain embodiments, brines and seawater are preferred.

In one embodiment, a degradable particulate diverting material of this invention contains a mixture of degradable aliphatic polyester and a hydrated organic or inorganic solid compound. As mentioned above, the hydrated organic or inorganic solid compounds that can be utilized include, but are not limited to, hydrates of organic acids or their salts such as sodium acetate trihydrate, L-tartaric acid disodium salt dihydrate, sodium citrate dihydrate, hydrates of inorganic acids or their salts such as sodium tetraborate decahydrate, sodium hydrogen phosphate heptahydrate, sodium phosphate dodecahydrate, amylose, starch-based hydrophilic polymers, and cellulose-based hydrophilic polymers. The lactide units of the aliphatic polyester and the releasable water from the organic or inorganic compound preferably are present in equal molar amounts.

As will now be understood by those skilled in the art, any one of a variety of treating fluids can be introduced into a subterranean producing zone in accordance with this invention. Because the treating fluid is diverted in the subterranean producing zone by the diverting materials of this invention, the treating fluid reaches the target part or parts of the subterranean zone. When the subterranean zone includes perforation tunnels, the treating fluid is uniformly distributed into the producing zone by a degradable particulate diverting material of this invention in the tunnels. After the treating fluid has been placed in the zone, the degradable particulate diverting material at least partially degrades, which allows the formation fluids to freely flow into the well bore. The fluid in which the degradable particulate diverting material may be degraded is released water or treating fluid water. When the degradable particulate diverting material is a self-degradable diverting material, the self-degradable particulate diverting material at least partially degrades in the releasable water provided by the hydrated organic or inorganic solid compound which is mixed with the degradable particulate when heated in the subterranean zone. Thus the degradable particulate diverting material is suitable even when non-aqueous treating fluids are utilized or when an aqueous treating fluid has dissipated within the formation or otherwise been removed from the formation such as by flowback.

In yet other embodiments of the present invention, the self-degradable particulate diverting material can be formed into particles of selected sizes. That is, the particulate degradable polymer can be degraded in a solvent such as methylene chloride, trichloroethylene, chloroform, cyclohexane, methylene diiodide, mixtures thereof and the like to which a very fine powder of the hydrated organic or inorganic compound is slurried. The solvent is then removed to form a solid material which can be formed into desired particle sizes. Alternatively, fine powders can be admixed and then granulated or pelletized to form mixtures having any desired particle sizes.

As will now be understood, the improved methods and degradable particulate diverting material of this invention do not require removal with a clean-up fluid to degrade the degradable particulate diverting materials as has been the practice heretofore. As a result, the methods and the degradable particulate diverting materials of this invention are much simpler and more economical to perform and use.

An example of one of the preferred methods of this invention for diverting a treating fluid in a subterranean zone penetrated by a well bore comprises the steps of: (a) placing a degradable particulate diverting material in the subterranean zone which is capable of degrading therein over time; (b) introducing a treating fluid into the subterranean zone which is diverted by the degradable particulate diverting material therein; and (c) introducing a source of releasable water into the subterranean zone and allowing the degradable particulate diverting material to at least partially degrade in the presence of the released water in the subterranean zone.

Another example of the improved methods of this invention for diverting a treating fluid in a subterranean zone penetrated by a well bore comprises the steps of: (a) placing a self-degradable particulate diverting material in the subterranean zone which degrades therein over time, the self-degradable particulate diverting material comprising a blend of a degradable polymer and a hydrated organic or inorganic compound; (b) introducing the treating fluid into the subterranean zone which is diverted by the self-degradable particulate diverting material therein; and (c) allowing the degradable polymer in the self-degradable particulate diverting material to at least partially degrade in the released water provided by the hydrated organic or inorganic compound which dehydrates over time when heated in the subterranean zone.

Yet another method of this invention for uniformly introducing a treating fluid into a subterranean zone penetrated by a well bore having perforation tunnels formed therein comprises the steps of: (a) packing a self-degradable particulate diverting material in the perforation tunnels which degrades therein over time, the self-degradable particulate diverting material comprising a mixture of a degradable polymer and a hydrated organic or inorganic compound; (b) introducing the treating fluid into the subterranean zone by way of the perforation tunnels which is diverted by the self-degradable particulate diverting material therein; and (c) allowing the degradable polymer in the self-degradable particulate diverting material to at least partially degrade in the releasable water provided by the hydrated organic or inorganic compound when heated in the subterranean zone.

A particularly preferred degradable particulate diverting material of this invention comprises poly(lactic acid). A particularly preferred particulate self-degradable particulate diverting material of this invention comprises a mixture of poly(lactic acid) and sodium acetate trihydrate.

In certain embodiments, the temperature of the subterranean formation into which the degradable particulate diverting materials are introduced has a temperature in excess of about 180° F. and most preferably a temperature in excess of about 200° F. to facilitate release of the water in the hydrated inorganic or organic solid compound. While no particular upper temperature limit is known to exist, the diverting material of the present invention is believed to be useful in formations having a temperature level in the range of from about 350° F. to about 500 F. and would be expected to function up to about the melting temperature of the particular material. Some stereoisomers of poly(lactide) or mixtures of such stereoisomers may be suitable for even higher temperature applications.

In order to further illustrate the methods and degradable diverting materials of this invention, the following examples are given. In no way should such examples be read to limit the scope of the invention.

EXAMPLE 1

To illustrate the ability of the degradable particulate diverting material or self-degradable particulate diverting material to at least partially degrade as discussed herein, the following tests were performed. One sample was prepared in accordance with the methods of the present invention by mixing 20 grams of an aliphatic polyester comprising poly (lactic acid) with 18 grams of sodium tetraborate decahydrate and the dry powdery mixture then was placed in a Teflon® lined stainless steel autoclave. The first mixture was heated in the autoclave under static conditions at 250° F. for 72 hours. A second sample was prepared by mixing 20 grams of the poly(lactic acid) with 9.5 grams of anhydrous sodium tetraborate and the dry powdery mixture then was placed in a Teflon® lined stainless steel autoclave. The second mixture also was heated in the autoclave under static conditions at 250° F. for 72 hours. After 72 hours the autoclaves were opened and the first sample was found to have been converted to a yellow liquid, which could be poured from the autoclave cell. The second sample appeared unchanged and was in the form of a dry powder. The test demonstrates that the degradable particulate can be degraded in the presence of released water from a hydrated solid compound.

Thus the present invention is well adapted to carry out the objects and attain the ends and advantages mentioned as well as those which are inherent therein. While numerous changes can be made by those skilled in the art, such changes are encompassed within the spirit of this invention as defined by the appended claims.

What is claimed is:

1. An improved method of diverting a treating fluid in a subterranean zone penetrated by a well bore comprising the steps of:
   (a) placing a degradable particulate diverting material comprising a degradable particulate in said subterranean zone;
   (b) introducing a treating fluid into said subterranean zone;
   (c) allowing the degradable particulate diverting material to divert at least a portion of the treating fluid into a particular region in the subterranean zone;
   (d) introducing a source of releasable water into said subterranean zone;
   (e) allowing the source of releasable water to release water; and
   (f) allowing the degradable particulate diverting material to at least partially degrade in the presence of the released water in the subterranean zone.

2. The method of claim 1 wherein the treating fluid introduced in accordance with step (b) is selected from the group consisting of water based foams, fresh water, salt water, formation water and various aqueous solutions.

3. The method of claim 2 wherein the treating fluid introduced in accordance with step (b) is selected from the group consisting of aqueous acid solutions, aqueous scale inhibitor material solutions, aqueous water blocking material solutions, aqueous clay stabilizer solutions, aqueous chelating agent solutions, aqueous surfactant solutions and aqueous paraffin removal solutions.

4. The method of claim 1 wherein the source of releasable water comprises a hydrated organic or inorganic compound.

5. A method of claim 4 wherein the hydrated organic or inorganic compound is selected from the group consisting of sodium acetate trihydrate, L-tartaric acid disodium salt dihydrate, sodium citrate dihydrate, sodium tetraborate decahydrate, sodium hydrogen phosphate heptahydrate, sodium phosphate dodecahydrate, amylose, starch-based hydrophilic polymers, and cellulose-based hydrophilic polymers.

6. The method of claim 1 wherein the degradable particulate comprises a degradable polymer.

7. The method of claim 6 wherein the degradable polymer is selected from the group consisting of polysaccharides, chitins, chitosans, proteins, aliphatic polyesters, poly(lactides), poly(glycolides), poly($\epsilon$-carprolactones), poly(hydroxybutyrates), poly(anhydrides), aliphatic polycarbonates, poly(orthoesters), poly(amino acids), poly(ethylene oxides), polyphoshazenes, and mixtures thereof.

8. An improved method of diverting a treating fluid in a subterranean zone penetrated by a well bore comprising the steps of:
(a) placing a self-degradable particulate diverting material in said subterranean zone, the self-degradable particulate diverting material comprising a mixture of a degradable particulate and a hydrated organic or inorganic compound solid;
(b) introducing a treating fluid into the subterranean zone;
(c) allowing the self-degradable particulate diverting material to divert the treating fluid into a particular region in the subterranean zone;
(d) allowing the hydrated organic or inorganic solid compound to release water; and
(e) allowing the degradable particulate in said self-degradable particulate diverting material to at least partially degrade in water released by the hydrated organic or inorganic solid compound.

9. The method of claim 8 wherein the degradable particulate comprises a degradable polymer.

10. The method of claim 9 wherein the degradable polymer is selected from the group consisting of polysaccharides, chitins, chitosans, proteins, aliphatic polyesters, poly(lactides), poly(glycolides), poly($\epsilon$-carprolactones), poly(hydroxybutyrates), poly(anhydrides), aliphatic polycarbonates, poly(orthoesters), poly(amino acids), poly(ethylene oxides), polyphosphazenes, and mixtures thereof.

11. The method of claim 8 wherein the degradable particulate further comprises a plasticizer.

12. The method of claim 8 wherein the degradable particulate comprises poly(lactic acid).

13. The method of claim 8 wherein the degradable particulate comprises a stereoisomer of a poly(lactide).

14. The method of claim 8 wherein the degradable particulate comprises poly(phenyllactide).

15. The method of claim 8 wherein the hydrated organic or inorganic solid compound comprises hydrates of organic acids or organic acid salts.

16. The method of claim 15 wherein the hydrafted organic or inorganic solid compound is selected from the group consisting of sodium acetate trihydrate, L-tartaric acid disodium salt dihydrate, sodium citrate dihydrate, sodium tetraborate decahydrate, sodium hydrogen phosphate heptahydrate, sodium phosphate dodecahydrate, amylose, starch-based hydrophilic polymers, and cellulose-based hydrophilic polymers.

17. The method of claim 8 wherein the organic or inorganic compound comprises sodium acetate trihydrate and the degradable particulate comprises poly(lactic acid).

18. The method of claim 8 wherein the degradable particulate comprises lactide units, the lactide units and the released water of the organic or inorganic compound being present in the mixture in equal molar amounts.

19. The method of claim 8 wherein the treating fluid introduced in accordance with step (b) is selected from the group consisting of oils, oil-water emulsions, oil based foams, water based foams, fresh water, salt water, formation water and various aqueous solutions.

20. The method of claim 19 wherein the treating fluid is an aqueous treating fluid solution selected from the group consisting of aqueous acid solutions, aqueous scale inhibitor material solutions, aqueous water blocking material solutions, aqueous clay stabilizer solutions, aqueous chelating agent solutions, aqueous surfactant solutions and aqueous paraffin removal solutions.

21. The method of claim 8 wherein the treating fluid is an aqueous acid solution comprising one or more acids selected from the group consisting of hydrochloric acid, hydrofluoric acid, acetic acid, formic acid and other organic acids.

22. The method of claim 21 wherein the acid is a mixture of hydrochloric acid and hydrofluoric acid.

23. The method of claim 8 wherein the treating fluid is an aqueous scale inhibitor material solution comprising one or more scale inhibitor materials selected from the group consisting of tetrasodium ethylenediamine acetate, pentamethylene phosphonate, hexamethylenediamine phosphonate, polyacrylate and mixtures thereof.

24. The method of claim 23 wherein the scale inhibitor material comprises a mixture of tetrasodium ethylenediamine acetate and pentamethylene phosphonate.

25. The method of claim 8 wherein the treating fluid is an aqueous water blocking material solution comprising one or more water blocking materials selected from the group consisting of sodium silicate gels, organic polymers with metal cross-linkers and organic polymers with organic cross-linkers.

26. A method of uniformly introducing a treating fluid into a subterranean zone penetrated by a well bore comprising perforation tunnels formed therein comprising the steps of:
(a) packing a self-degradable particulate diverting material in the perforation tunnels, the self-degradable particulate diverting material comprising a mixture of a degradable particulate and a hydrated organic or inorganic compound;
(b) introducing a treating fluid into said subterranean zone by way of said perforation tunnels;
(c) allowing the self-degradable particulate diverting material to divert the treating fluid into a particular region in the subterranean zone;
(d) allowing the hydrated organic or inorganic solid compound to release water; and
(e) allowing the degradable particulate in the self-degradable particulate diverting material to at least partially degrade in the water released by the hydrated organic or inorganic compound.

27. The method of claim 26 wherein the degradable particulate comprises a degradable polymer.

28. The method of claim 27 wherein the degradable polymer is selected from the group consisting of polysaccharides, chitins, chitosans, proteins, aliphatic polyesters, poly(lactides), poly(glycolides), poly($\epsilon$-carprolactones), poly(hydroxybutyrates), poly(anhydrides), aliphatic polycarbonates, poly(orthoesters), poly(amino acids), poly(ethylene oxides), polyphosphazenes, and mixtures thereof.

29. The method of claim 26 wherein the degradable particulate further comprises a plasticizer.

30. The method of claim 26 wherein the degradable particulate comprises poly(lactic acid).

31. The method of claim 26 wherein the degradable particulate comprises a stereoisomer of a poly(lactide).

32. The method of claim 26 wherein the degradable particulate comprises poly(phenyllactide).

33. The method of claim 26 wherein the hydrated organic or inorganic solid compound comprises hydrates of organic acids or organic acid salts.

34. The method of claim 33 wherein the hydrated organic or inorganic solid compound is selected from the group consisting of sodium acetate trihydrate, L-tartaric acid disodium salt dihydrate, sodium citrate dihydrate, sodium tetraborate decahydrate, sodium hydrogen phosphate heptahydrate, sodium phosphate dodecahydrate, amylose, starch-based hydrophilic polymers, and cellulose-based hydrophilic polymers.

35. The method of claim 26 wherein the organic or inorganic compound comprises sodium acetate trihydrate and the degradable particulate comprises poly(lactic acid).

36. The method of claim 26 wherein the degradable particulate comprises lactide units, the lactide units and the released water of the organic or inorganic compound being present in the mixture in equal molar amounts.

37. The method of claim 26 wherein the treating fluid introduced in accordance with step (b) is selected from the group consisting of oils, oil-water emulsions, oil based foams, water based foams, fresh water, salt water, formation water and various aqueous solutions.

38. The method of claim 37 wherein the treating fluid is an aqueous treating fluid solution selected from the group consisting of aqueous acid solutions, aqueous scale inhibitor material solutions, aqueous water blocking material solutions, aqueous clay stabilizer solutions, aqueous chelating agent solutions, aqueous surfactant solutions and aqueous paraffin removal solutions.

39. The method of claim 26 wherein the treating fluid is an aqueous acid solution comprising one or more acids selected from the group consisting of hydrochloric acid, hydrofluoric acid, acetic acid, formic acid and other organic acids.

40. The method of claim 39 wherein the acid is a mixture of hydrochloric acid and hydrofluoric acid.

41. The method of claim 26 wherein the treating fluid is an aqueous scale inhibitor material solution comprising one or more scale inhibitor materials selected from the group consisting of tetrasodium ethylenediamine acetate, pentamethylene phosphonate, hexamethylenediamine phosphonate, polyacrylate and mixtures thereof.

42. The method of claim 41 wherein the scale inhibitor material comprises a mixture of tetrasodium ethylenediamine acetate and pentamethylene phosphonate.

43. The method of claim 26 wherein the treating fluid is an aqueous water blocking material solution comprising one or more water blocking materials selected from the group consisting of sodium silicate gels, organic polymers with metal cross-linkers and organic polymers with organic cross-linkers.

44. An method of diverting a treating fluid in a subterranean zone penetrated by a well bore comprising the steps of:
(a) placing a self-degradable particulate diverting material in the subterranean zone, the self-degradable particulate diverting material comprising a degradable particulate;
(b) introducing a treating fluid into the subterranean zone;
(c) allowing the self-degradable particulate diverting material to divert the treating fluid into a particular region in the subterranean zone;
(d) introducing a source of releasable water into the subterranean zone;
(e) allowing the source of releasable water to release water; and
(f) allowing the degradable particulate to at least partially degrade in the presence of said released water in said subterranean zone.

45. The method of claim 44 wherein the source of releasable water is a hydrated organic or inorganic solid compound selected from the group consisting of sodium acetate trihydrate, L-tartaric acid disodium salt dihydrate, sodium citrate dihydrate, sodium tetraborate decahydrate, sodium hydrogen phosphate heptahydrate, sodium phosphate dodecahydrate, amylose, starch-based hydrophilic polymers, and cellulose-based hydrophilic polymers.

46. The method of claim 45 wherein the organic or inorganic compound is sodium acetate trihydrate.

47. The method of claim 42 wherein the degradable particulate comprises a degradable polymer.

48. The method of claim 47 wherein the degradable polymer is selected from the group consisting of polysaccharides, chitins, chitosans, proteins, aliphatic polyesters, poly(lactides), poly(glycolides), poly($\epsilon$-carprolactones), poly(hydroxybutyrates), poly(anhydrides), aliphatic polycarbonates, poly(orthoesters), poly(amino acids), poly(ethylene oxides), polyphosphazenes, and mixtures thereof.

49. The method of claim 44 wherein the degradable particulate further comprises a plasticizer.

50. The method of claim 44 wherein the degradable particulate comprises poly(lactic acid).

51. The method of claim 44 wherein the degradable particulate comprises a stereoisomer of a poly(lactide).

52. The method of claim 44 wherein the degradable particulate comprises poly(phenyllactide).

53. The method of claim 45 wherein the degradable particulate comprises lactide units, the lactide units and the released water of the organic or inorganic compound being present in said mixture in equal molar amounts.

54. The method of claim 44 wherein the treating fluid introduced in accordance with step (b) is selected from the group consisting of oils, oil-water emulsions, oil based foams, water based foams, fresh water, salt water, formation water and various aqueous solutions.

55. The method of claim 44 wherein the treating fluid is an aqueous treating fluid solution selected from the group consisting of aqueous acid solutions, aqueous scale inhibitor material solutions, aqueous water blocking material solutions, aqueous clay stabilizer solutions, aqueous chelating agent solutions, aqueous surfactant solutions and aqueous paraffin removal solutions.

56. The method of claim 44 wherein the treating fluid is an aqueous acid solution comprising one or more acids selected from the group consisting of hydrochloric acid, hydrofluoric acid, acetic acid, formic acid and other organic acids.

57. The method of claim 56 wherein the acid is a mixture of hydrochloric acid and hydrofluoric acid.

58. The method of claim 44 wherein the treating fluid is an aqueous scale inhibitor material solution comprising one or more scale inhibitor materials selected from the group consisting of tetrasodium ethylenediamine acetate, pentamethylene phosphonate, hexamethylenediamine phosphonate, polyacrylate and mixtures thereof.

59. The method of claim 58 wherein the scale inhibitor material comprises a mixture of tetrasodium ethylenediamine acetate and pentamethylene phosphonate.

60. The method of claim 44 wherein the treating fluid is an aqueous water blocking material solution comprising one or more water blocking materials selected from the group consisting of sodium silicate gels, organic polymers with metal cross-linkers and organic polymers with organic cross-linkers.

* * * * *